US010833960B1

(12) United States Patent
Ranchal et al.

(10) Patent No.: US 10,833,960 B1
(45) Date of Patent: Nov. 10, 2020

(54) SLA MANAGEMENT IN COMPOSITE CLOUD SOLUTIONS USING BLOCKCHAIN

(71) Applicant: INTERNATIONAL BUSINESS MACHINES CORPORATION, Armonk, NY (US)

(72) Inventors: Rohit Ranchal, Cambridge, MA (US); Olivia Choudhury, Cambridge, MA (US); Amarendra Das, Cambridge, MA (US); Senthil Bakthavachalam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/559,724

(22) Filed: Sep. 4, 2019

(51) Int. Cl.
*G06F 15/16* (2006.01)
*H04L 12/24* (2006.01)
*G06Q 20/38* (2012.01)
*G06F 16/182* (2019.01)

(52) U.S. Cl.
CPC ...... *H04L 41/5009* (2013.01); *G06F 16/1824* (2019.01); *G06Q 20/382* (2013.01); *H04L 41/5025* (2013.01)

(58) Field of Classification Search
CPC .................................................. H04L 41/5009
USPC ........................................................ 709/223
See application file for complete search history.

(56) References Cited

U.S. PATENT DOCUMENTS

| 6,556,659 | B1 | 4/2003 | Bowman-Amuah |
| 7,523,041 | B2 | 4/2009 | Chen |
| 2008/0037532 | A1* | 2/2008 | Sykes ............... H04L 41/147 370/389 |
| 2010/0083145 | A1 | 4/2010 | Schang |
| 2010/0114531 | A1* | 5/2010 | Korn ............... G06Q 10/06 702/186 |

(Continued)

OTHER PUBLICATIONS

Aniello, et al., "A Blockchain-Based Solution for Enabling Log-Based Resolution of Disputes in Multi-party Transactions." Proceedings of 5th International Conference in Software Engineering for Defence Applications, SEDA 2016, Advances in Intelligent Systems and Computing, vol. 717, Springer, Cham, pp. 1-5.

(Continued)

*Primary Examiner* — Hamza N Algibhah
(74) *Attorney, Agent, or Firm* — Robert C. Bunker

(57) ABSTRACT

A method, computer system, and a computer program product for SLA management is provided. The method may include collecting metrics from services within a composite service. The method may include determining, by a first smart contract, a first violation occurred between a first pair of services, whereby the first smart contract and the first pair of services are associated with a first private channel within a blockchain network. The method may include determining, by a second smart contract, a second SLA violation occurred between a second pair of services, whereby the second smart contract and the second pair of services are associated with a second private channel. The method may include determining that the first SLA violation and second SLA violation are related and the second SLA violation occurred before the first SLA violation. The method may include identifying a violating service within the second pair of services.

20 Claims, 9 Drawing Sheets

(56) References Cited

U.S. PATENT DOCUMENTS

| | | | | |
|---|---|---|---|---|
| 2010/0218031 | A1* | 8/2010 | Agarwal | G06F 11/0709 |
| | | | | 714/2 |
| 2013/0332224 | A1 | 12/2013 | Haddad | |
| 2014/0337510 | A1* | 11/2014 | Gesmann | H04L 41/5009 |
| | | | | 709/224 |
| 2014/0358626 | A1* | 12/2014 | Bardhan | G06Q 10/0635 |
| | | | | 705/7.28 |
| 2015/0067143 | A1* | 3/2015 | Babakhan | H04L 63/20 |
| | | | | 709/224 |
| 2017/0287090 | A1* | 10/2017 | Hunn | G06Q 50/18 |
| 2017/0322861 | A1* | 11/2017 | Chan | G06F 9/50 |
| 2018/0046951 | A1 | 2/2018 | Mohindra | |
| 2018/0082390 | A1* | 3/2018 | Leidner | G06Q 50/18 |
| 2018/0096175 | A1* | 4/2018 | Schmeling | G06Q 10/08 |
| 2018/0096360 | A1* | 4/2018 | Christidis | G06Q 20/02 |
| 2018/0248745 | A1* | 8/2018 | Ahmed | G06F 11/008 |
| 2018/0254982 | A1* | 9/2018 | Apostolopoulos | H04L 45/302 |
| 2018/0285979 | A1 | 10/2018 | Chessell | |
| 2018/0322588 | A1* | 11/2018 | Linne | G06Q 50/18 |
| 2019/0014124 | A1* | 1/2019 | Reddy | H04L 63/108 |
| 2019/0362446 | A1* | 11/2019 | Navarro | G06Q 10/06315 |
| 2020/0134637 | A1* | 4/2020 | Srinivasan | G06F 40/174 |
| 2020/0235947 | A1* | 7/2020 | Baykaner | H04L 9/0816 |

OTHER PUBLICATIONS

Di Pascale, et al. "Smart Contract SLAs for Dense Small-Cell-as-a-Service." arXiv:1703.04502v1 [cs.NI], Mar. 13, 2017, pp. 1-2.

Iotcoresoft, "How Service Level Agreement (SLA) Management Can Benefit from Blockchain", https://www.Iotcoresoft.com/iot-knowlegde-center/how-service-level-agreement-sla-management-can-benefit-from-blockchain, Jan. 21, 2018, pp. 1-6.

Mell, et al., "The NIST Definition of Cloud Computing", National Institute of Standards and Technology, Special Publication 800-145, Sep. 2011, 7 pages.

Nakashima, et al., "An Automation Method of SLA Contract of Web APIs and Its Platform Based on Blockchain Concept", 2017 IEEE 1st International Conference on Cognitive Computing, pp. 32-39.

Rosa, et al., "Blockchain-based Decentralized Applications meet Multi-Administrative Domain Networking," SIGCOMM Posters and Demos '18, Aug. 20-25, 2018, Budapest, Hungary, pp. 114-116.

Singh, et al., "Comparative Requirements Analysis for the Feasibility of Blockchain for Secure Cloud," Springer Nature Singapore Pte Ltd., CCIS 809 2018, pp. 57-72.

* cited by examiner

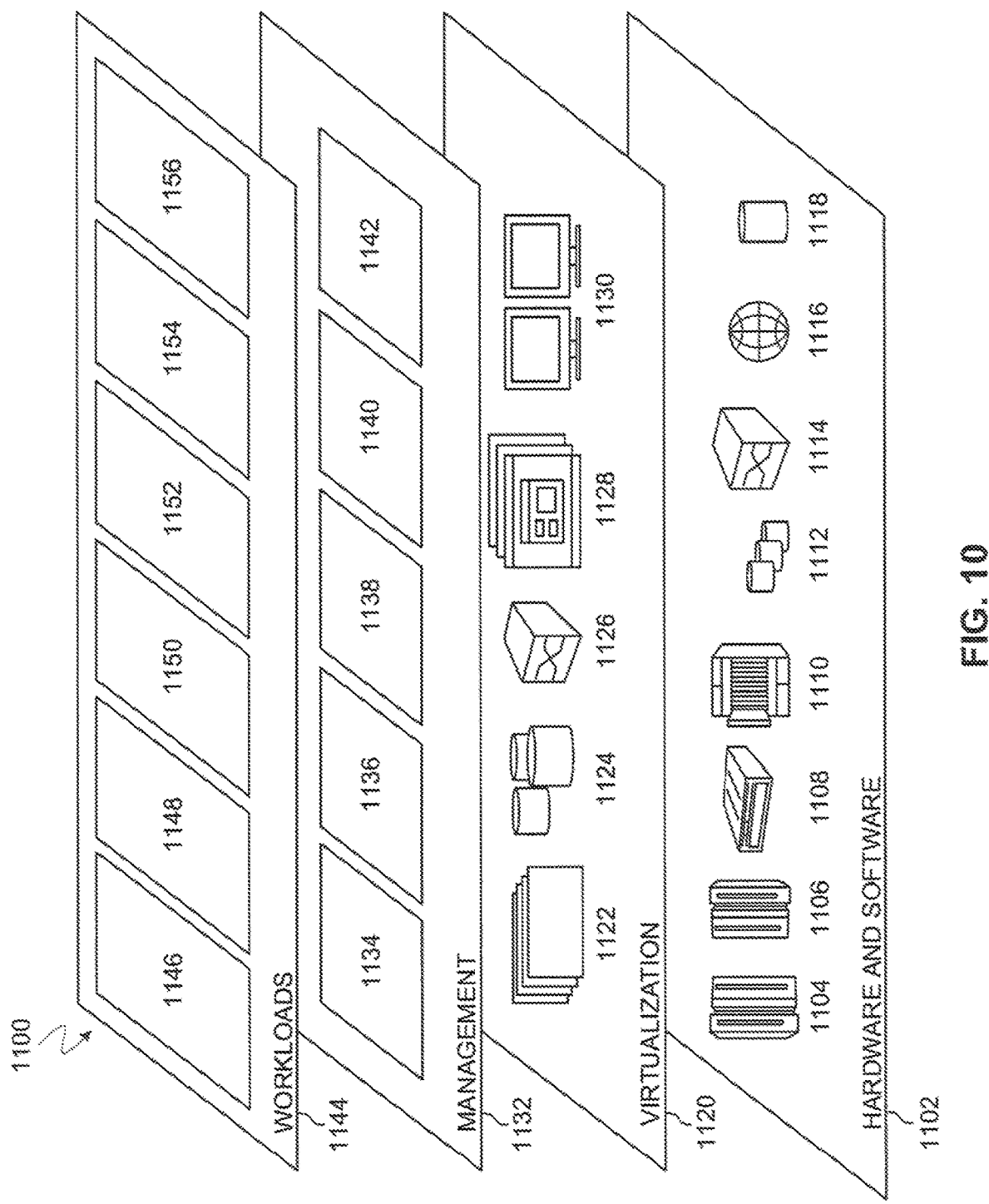

SLA MANAGEMENT IN COMPOSITE CLOUD SOLUTIONS USING BLOCKCHAIN

BACKGROUND

The present invention relates generally to the field of computing, and more particularly to service level agreement (SLA) management.

Modern cloud-based solution development and deployment is based on a service-oriented architecture resulting in composite solutions. The solution owners discover qualified services from different cloud marketplaces that meet their requirements and orchestrate them to develop their composite solutions. To ensure a minimum level of service, service providers and clients often use SLAs. SLA management, monitoring, and detecting SLA violations are important for maintaining quality in composite solutions.

SUMMARY

According to one exemplary embodiment, a method for service level agreement (SLA) management within a composite service using a blockchain network is provided. The method may include collecting a plurality of service metrics from a plurality of services within the composite service. The method may also include determining, by a first SLA smart contract, a first SLA violation occurred based on the collected plurality of service metrics violating a first SLA between a first pair of services within the plurality of services, wherein the first SLA smart contract and the first pair of services are associated with a first private channel within the blockchain network. The method may then include determining, by a second SLA smart contract, a second SLA violation occurred based on the collected plurality of service metrics violating a second SLA between a second pair of services within the plurality of services, wherein the second SLA smart contract and the second pair of services are associated with a second private channel within the blockchain network. The method may further include, in response to determining the first SLA violation occurred and the second SLA violation occurred, determining that the first SLA violation and second SLA violation are related and the second SLA violation occurred before the first SLA violation. The method may also include, in response to determining the first SLA violation and second SLA violation are related and the second SLA violation occurred before the first SLA violation, identifying a violating service within the second pair of services that is responsible for causing the first SLA violation.

A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 10 is a block diagram of functional layers of the illustrative cloud computing environment of FIG. 9, in accordance with an embodiment of the present disclosure.

DETAILED DESCRIPTION

Figure 1:
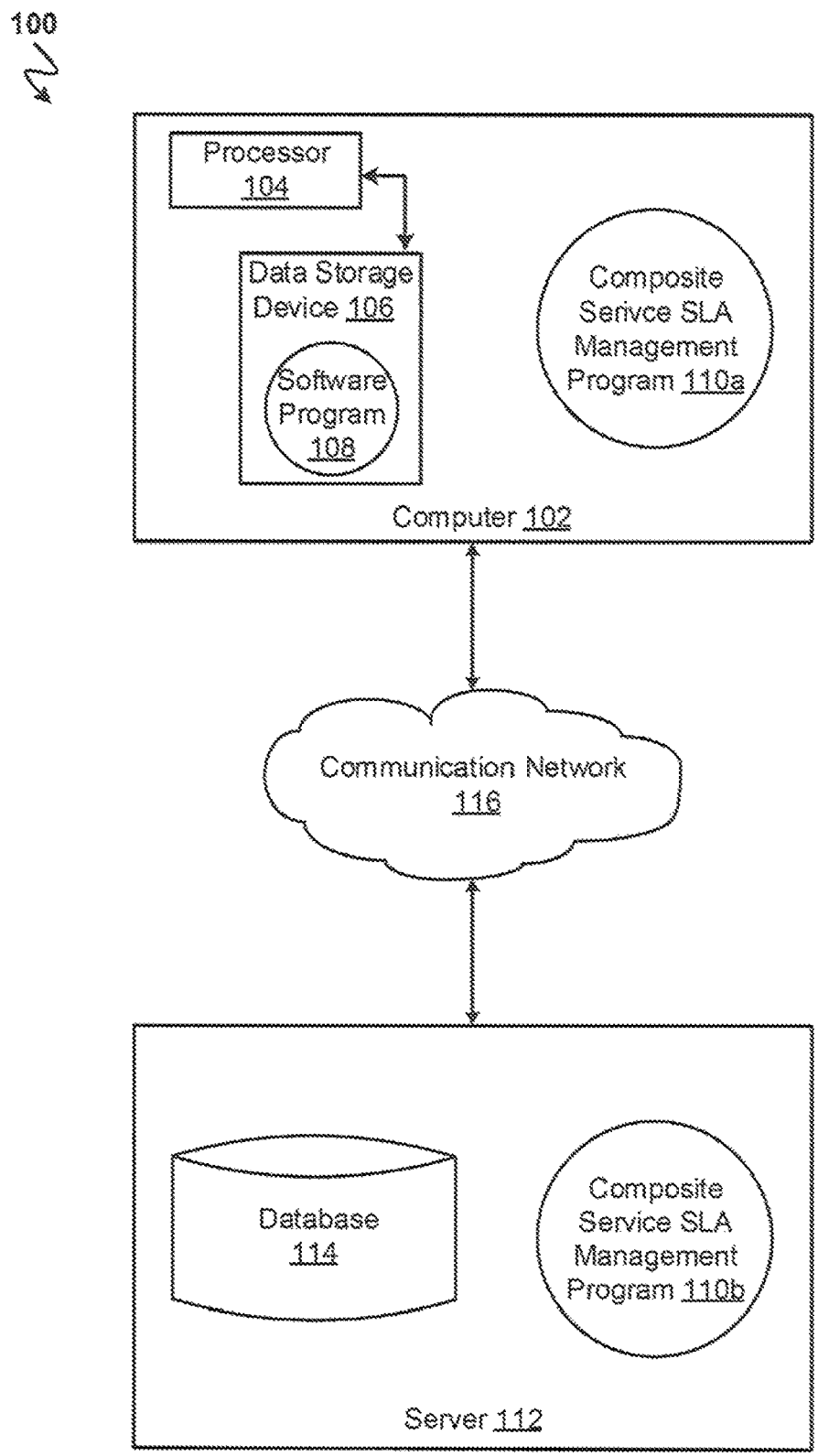
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and program product for service level agreement (SLA) management in composite cloud environments using blockchain. As such, the present embodiment has the capacity to improve the technical field of SLA management by monitoring individual SLA violations in composite service environments and determining the specific source of an SLA violation while maintaining SLA confidentiality. More specifically, individual private channels within a blockchain framework are formed which correspond to the services and sub-services that are parties to an SLA. Within each private channel, a smart contract is utilized which monitors and detects breaches of the SLA. In response to detecting an SLA violation, the event and a timestamp are recoded within the channel. The root cause of an SLA violation may then be determined by traversing dependent sub-services to identify the private channel that recorded the initial SLA violation to establish event causality.

As described previously, modern cloud-based solution development and deployment is based on a service-oriented architecture resulting in composite solutions. The solution owners discover qualified services from different cloud marketplaces that meet their requirements and orchestrate them to develop their composite solutions. To ensure a minimum level of service, service providers and clients often use SLAs.

The SLAs can be generally described by constraints such as application programming interface (API) request rate, API response time, availability, recovery point objective (RPO), recovery time objective (RTO), and the like. The SLAs ensure quality of service and prevent unintended consequences if a service violates the SLAs the service is obligated to maintain. SLA management, monitoring, and detecting SLA violations are important for maintaining quality in composite solutions.

Currently, SLAs are managed through legal documents and require manual operations for administration. These documents may be complex, open to interpretation, and not readily enforced. Generally, there is no automated monitoring of SLAs and SLA violations may therefore go undetected until an adverse event occurs.

SLA monitoring becomes even more complex in composite solutions built using services from different cloud marketplaces. In composite solutions, there can be several layers of dependent services and the various services could belong to different service providers. The higher layer service providers only have visibility into the services at the adjacent service layer below. The services do not freely disclose service composition and the dependent services that a service uses. Therefore, the complete hierarchy of the composite solution may be unknown to a single entity. The individual SLAs between clients and services are confidential and may not be freely shared with unknown parties for SLA monitoring and violation detection. When an adverse event occurs at a service, the event could have been caused due to the SLA violation of a dependent service at a lower level within the hierarchy. Without complete visibility into the composite solution hierarchy, monitoring the SLAs between clients and service providers across the composite solution and identify the root-cause of an SLA violation is difficult.

Therefore, it may be advantageous to, among other things, provide a trusted monitoring system that can monitor individual SLAs between services and sub-services while preserving the confidentiality of SLAs and still detect root causes of SLA violations without having a complete view of the cross-provider composite cloud topology.

According to at least one embodiment, private channels are created in the blockchain network to manage individual SLAs (i.e., SLA channels) for each composite service and the composite service's direct dependencies (i.e., dependent sub-services). Further, one or more private channels may be created for monitoring service metrics (i.e., monitoring channel) and for determining the root cause of violations (i.e., root cause analysis (RCA) channel). The use of private channels may ensure that information related to a channel, including the channel members, data transactions, ledger, and smart contract functionalities, are only accessible by the channel members, thereby ensuring privacy and confidentiality.

In embodiments, services (e.g., cloud-based services) may initially register with the monitoring channel. The monitoring channel may include a set of nodes that monitor one or more registered services, collecting standard operational metric data (offered by the service and in use with the service's SLAs). A smart contract may be defined for the nodes that are monitoring services for validating and recording the collected metric data. The smart contract may use various endorsement policies which are created to monitor and record the SLA data for the service when a service is onboarded (i.e., registered) to the monitoring channel. According to some embodiments, an endorsement policy may be created such that the majority of the nodes used for monitoring a service should be from different providers. For example, if the service is operated by Company X, an endorsement policy may specify that Company X nodes would not monitor the service and other company nodes, such as Company Y and Company Z could perform the monitoring. The services may define custom metrics that need to be monitored when the service onboards with the monitoring channel. In operation, the nodes in the channel periodically monitor the registered services and aggregate the monitored data. In embodiments, nodes may initiate transactions at fixed intervals that triggers the smart contract to record the aggregated data. Based on the terms of the smart contract, data is reported from each node, data is reconciled (e.g., different nodes may not agree on the measured metric data), outlying metric data measured by nodes may be flagged, and the aggregated data may then be stored in a state database.

In embodiments, each SLA channel may maintain a ledger and may be governed by a smart contract based on the SLAs being managed. In each channel, the quality of service (QoS) constraints defined in the SLA may be stored in a state database corresponding with the ledger. This allows benchmark constraints to be secured from unauthorized access and logging any attempts to access the constraints. For a given SLA channel, the smart contract functions refer to the benchmark data stored in the state database to verify if the dependent services maintain the required QoS, as defined by the SLA constraints. For example, the SLA constraints may include minimum API response time and minimum API request rate. The individual SLA channels may request the metric data pertaining to the services within the SLA channel from the monitoring channel. Thereafter, the metric data stored in the state database maintained by the monitoring channel may be transferred to the SLA channel such that the SLA channel may determine if an SLA violation occurred. If a service fails to comply with an SLA constraint requirement, the instance may be timestamped and immediately recorded on the immutable transaction log (i.e., SLA channel ledger) with the event attributes (i.e., violation data), such as the services that are involved in the SLA channel, SLA constraint, and timestamp.

The root cause analysis (RCA) channel is a system-wide channel created to identify the service which caused the SLA violation. The RCA channel collects data describing SLA violations from the ledgers of the SLA channels. Based on the collected SLA violation data, the RCA channel may first identify the sub-composition of the services involved with the SLA violation. In other words, the RCA channel may identify services that have a dependency relationship and have the same SLA violations present. Thereafter, the RCA channel analyzes the timelines of services in the sub-composition. The RCA channel may correlate the violation event with events in other SLA channels down the composite service hierarchy based on the SLA channel's timelines to establish causality of events. Causality may be determined by following instances of the SLA violation of the same (or related) constraint and within a threshold of time down the service hierarchy until the all the related SLA violations are located. Once the chain of SLA violations is established, the service that breached the service's SLA to cause the chain of SLA violations in the solution hierarchy will be identified as the root cause of the SLA violation. This enables detection of the root cause of the SLA violation in real-time that may help to make an appropriate correcting action based on the service and violated constraint and apply a violation penalty to the offending service (e.g., a financial penalty may be assessed).

Embodiments disclosed herein may utilize a blockchain network to perform the claimed method, system, or computer program product. Blockchain frameworks provide tamper evident and tamper resistant digital ledgers composed of multiple data blocks chained together that record transactions. The ledgers are implemented in a distributed fashion without a central repository and without a central authority. In operation, a blockchain allows a group of users to record and propagate transactions in the shared digital ledger such that transactions may not be altered once published in the ledger. The blockchain structure of blocks relies on cryptographic linking of each block to the prior block, for example, by using a hash or other unique signature of the prior block. Any tampering with a block in the blockchain will cause a mismatch of the hash stored in a block and the hash of the preceding block, thus indicating that the blockchain has been altered. Before a new block is added to the ledger, the block will be verified and authenticated. A user may publish a new block to the ledger according to a predefined consensus protocol. As new blocks are added to the blockchain, older blocks become harder to modify. New blocks are propagated across copies of the ledger within the network and any conflicts in the newest version of the blockchain are resolved automatically using predetermined rules.

Blockchain networks may be public or private. In public blockchains anyone may join the network and participate in data transactions and participants may be anonymous. However, in public blockchains there is limited or no privacy for transactions, nor any regulation regarding which participants may join. Examples of public blockchains include most cryptocurrencies. In private blockchains, participation is controlled, and only invited users may join the network. Some implementations of private blockchains may also restrict participant activity such that certain transactions may only be handled by a designated subset of participants within the network. Since admission to the private blockchain is limited and controlled, transactions recorded in the ledger are private. An example of a private blockchain is the Hyperledger® (Hyperledger and all Hyperledger-based trademarks and logos are trademarks or registered trademarks of The Linux Foundation non-profit corporation, and/or its affiliates) blockchain framework. Private blockchains may also support private channels within the blockchain network. A private channel is composed of a subset of participants from the private blockchain network and has a unique ledger thus allowing users within the private channel to make transactions that are kept confidential from the members of the private blockchain network that are not members of the private channel.

Blockchain networks may allow the use of smart contracts. Smart contracts are a collection of code and data that may be deployed to facilitate, verify, or enforce the negotiation or performance of a contract. A smart contract is executed by nodes within the blockchain network and all nodes that execute the smart contract must generate the same results. Smart contract results may be recoded on the blockchain ledger.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a composite service SLA management program 110a. The networked computer environment 100 may also include a server 112 that is enabled to run a composite service SLA management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the composite service SLA management program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the composite service SLA management program 110a, 110b (respectively) to pinpoint the root cause of SLA violations within composite services. The composite service SLA management method is explained in more detail below with respect to FIGS. 2-7.

Figure 2:
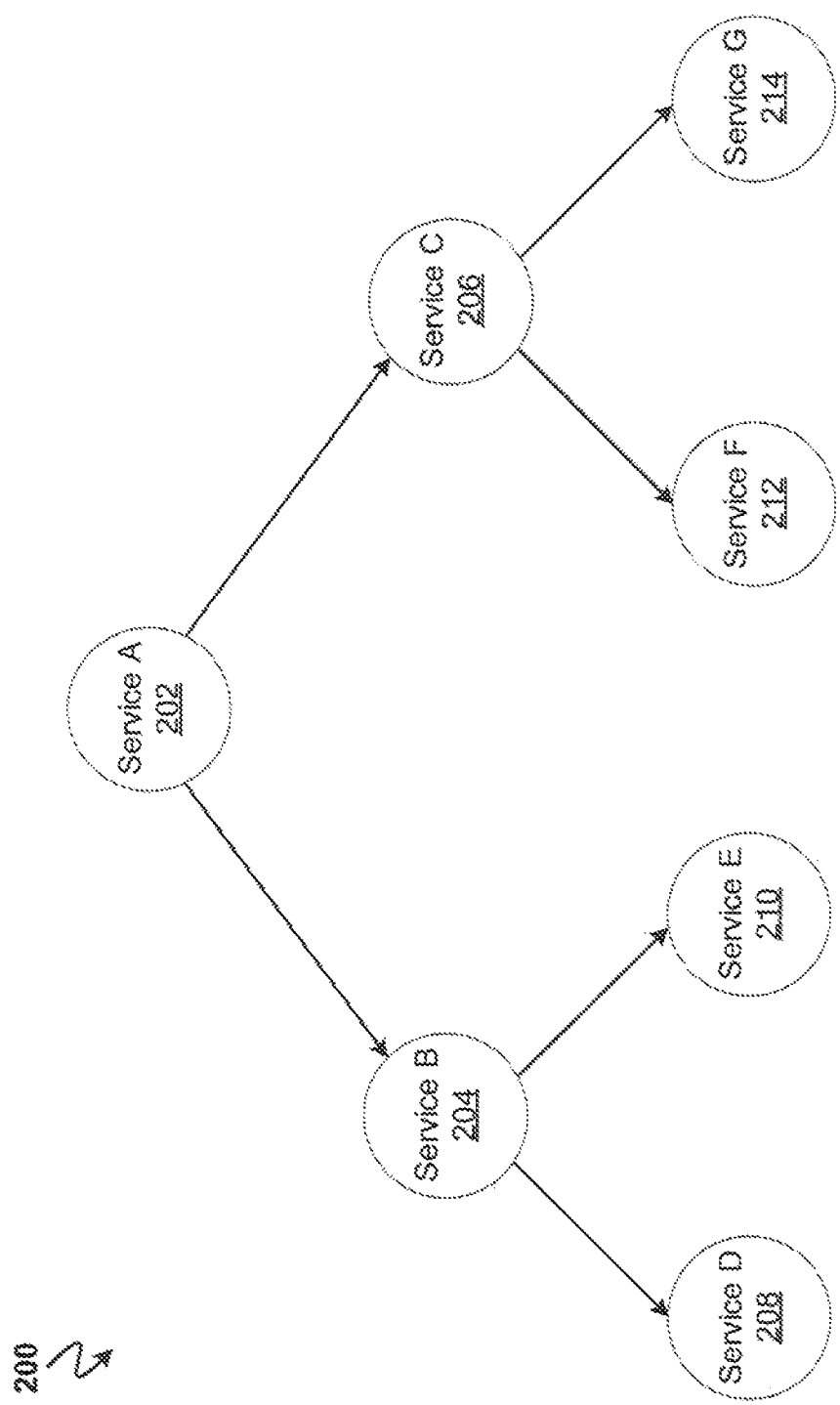
FIG. 2 illustrates an exemplary composite service hierarchy according to at least one embodiment.

Referring now to FIG. 2, an exemplary composite service hierarchy 200 according to at least one embodiment is depicted. Services are depicted as nodes with arrows or directed edges representing service dependencies. As shown, the example composite service, Service A 202, has dependent sub-services Service B 204 and Service C 206. Sub-service Service B 204 depends on sub-service Service D 208 and Service E 210. Additionally, sub-service Service C 206 depends on sub-service Service F 212 and Service G 214. For purposes of illustration, Service A 202 may correspond with a trip planning service. A trip planning service may rely on multiple sub-services to successfully complete a trip plan. For instance, air travel reservation and hotel reservation services corresponding with Service B 204 and Service C 206, respectively, may be used by the trip planning service to complete a trip plan involving air travel and a hotel stay. It should be appreciated that any other composite service is applicable to the method described herein and as such the example above is not limiting.

In many instances, constituent sub-services within the composite service may be operated by different providers.

For example, Company X may operate Service A 202, Company Y may operate Service B 204 and Company Z may operate Service C 206.

Figure 3:
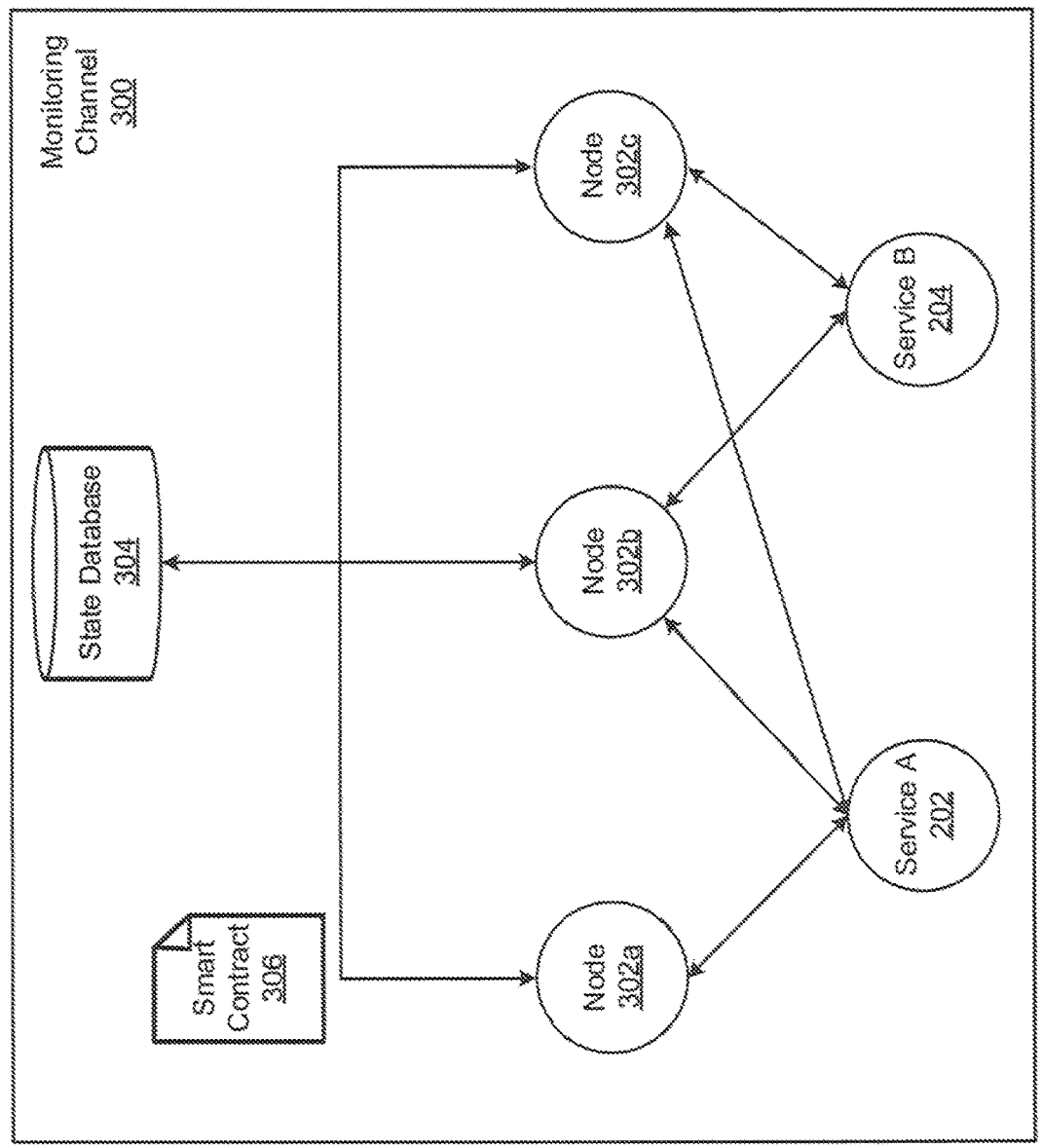
FIG. 3 illustrates an exemplary monitoring channel according to at least one embodiment.

Referring now to FIG. 3, an exemplary monitoring channel 300 according to at least one embodiment is depicted. In embodiments, the monitoring channel 300 is a system-wide channel within a private blockchain network that includes the constituent services (e.g., Service B 204) of the composite service (i.e., Service A 202) and nodes 302a-c. The monitoring channel stores service metric data in a database 114, designated as the state database 304, that was collected by the nodes 302a-c in accordance with the requirements of the applicable smart contracts 306a-b.

In operation, the monitoring channel 300 may onboard services (e.g., Service A 202) and create a smart contract 306 that specifies certain service level agreement (SLA) metrics the onboarding service wants to have tracked. The SLA metrics (or constraints) may include, for example, application programming interface (API) request rate, API response time, availability, recovery point objective (RPO), recovery time objective (RTO), and the like. The smart contract 306 may include the service to track (e.g., Service A 202) and the specific SLA metrics of the service that will be tracked and recorded (e.g., API response time). According to at least one embodiment, the smart contract 306 may be created at the time a service is onboarded to the monitoring channel 300. For example, when Service A 202 onboards to the monitoring channel 300 with a request to monitor API response time. In response to onboarding Service A 202, a smart contract 302a is created that requires the API response time of Service A 202 be monitored and recorded by the nodes 302a-c in the monitoring channel 300.

In some embodiments, an endorsement policy may also be created as the service is onboarded (i.e., registered) to the monitoring channel 300. The endorsement policy may dictate that the majority of nodes 302a-c used to monitor the onboarding service (e.g., Service A 202) are from providers that are different from provider of the onboarding service. Alternatively, the endorsement policy may require that no nodes 302a-c monitoring the onboarding service are operated by the same provider as the onboarding service. Limiting or prohibiting nodes 302a-c from monitoring the onboarding service with the same provider increases trust and integrity by reducing potential conflicts of interest in determining the root cause of SLA violations. Continuing the previous example, if the provider for Service A 202 is Company X, the provider for node 302a is Company Y, the provider for node 302b is Company W, and the provider for node 302c is Company P, when Service A 202 onboards, nodes 302a-c may all monitor the Service A 202 since the providers for nodes 302a-c are different than the provider of Service A 202. However, when Service B 204 registers with the monitoring channel 300, only node 302b and node 302c may monitor Service B 204 (i.e., node 302a is excluded from monitoring Service B 204) since node 302a and Service B 204 share the same provider or operator. In order to correctly assess the providers of the nodes 302a-c and the services within the monitoring channel 300, the nodes 302a-c and services would identify their respective providers. If there are any changes in providers for the nodes 302a-c or services, notice of the change in provider may be made and may result in changing which nodes 302a-c monitor services within the monitoring channel 300 in order to maintain the endorsement policy.

Figure 4:
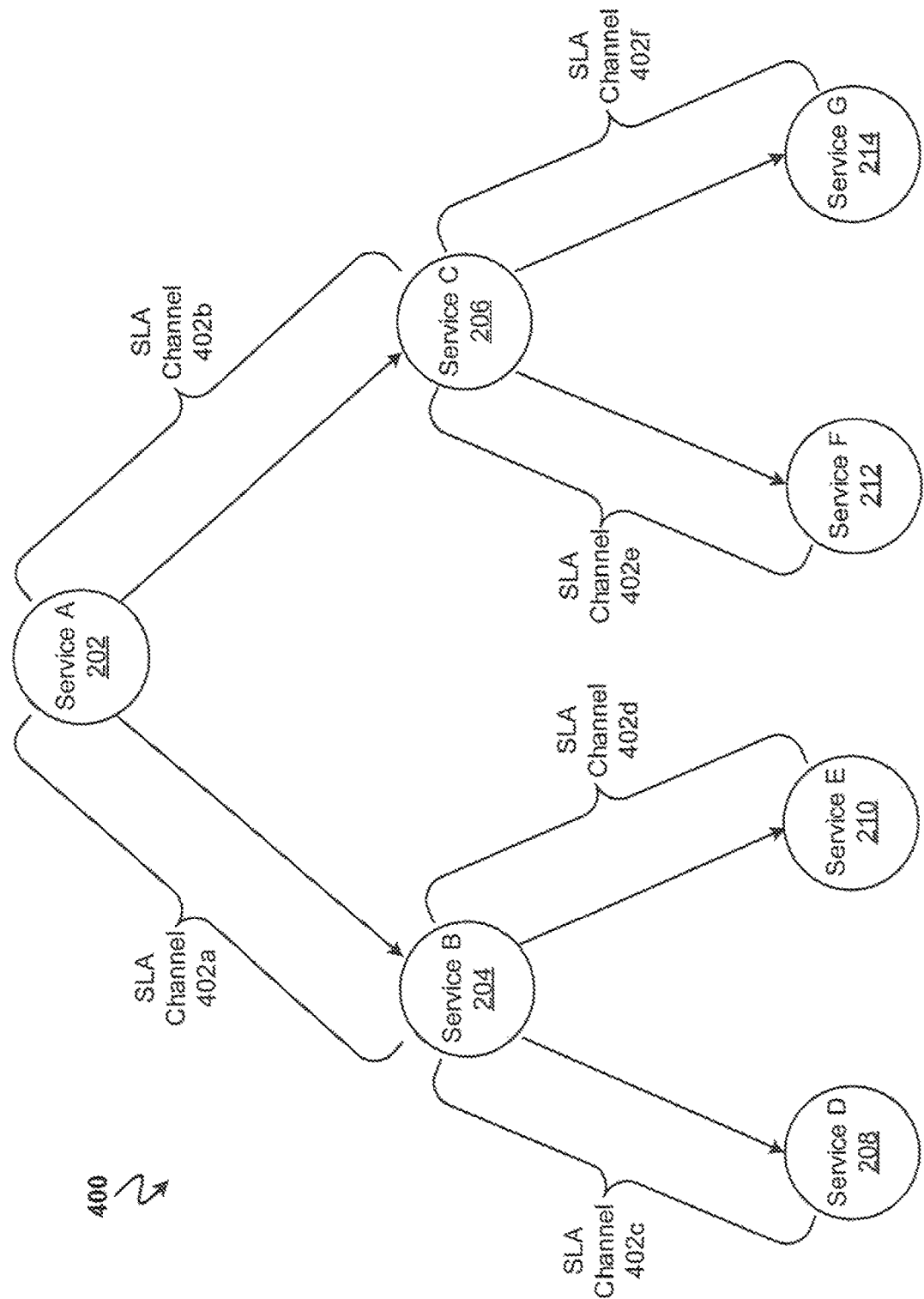
FIG. 4 illustrates an exemplary service level agreement channel mapping formed for the composite service hierarchy depicted in FIG. 2 according to at least one embodiment.

Referring now to FIG. 4, an example of a service level agreement (SLA) channel mapping 400 formed for the composite service hierarchy 200 depicted in FIG. 2 according to at least one embodiment is depicted. As shown in the SLA channel mapping 400, an individual SLA channel 402a-f is formed as a private channel between two services which have a dependency relationship. The SLA channels 402a-f constitute private channels within the private blockchain network. For example, SLA channel 402a is formed having Service A 202 and Service B 204 as members of the private channel since Service A 202 directly depends on sub-service Service B 204. Additional SLA channels 402a-f are created for each pair of services that directly depend on one another within the composite service. As depicted in the specific example composite service shown in FIG. 4, six SLA channels 402a-f are created.

Figure 5:
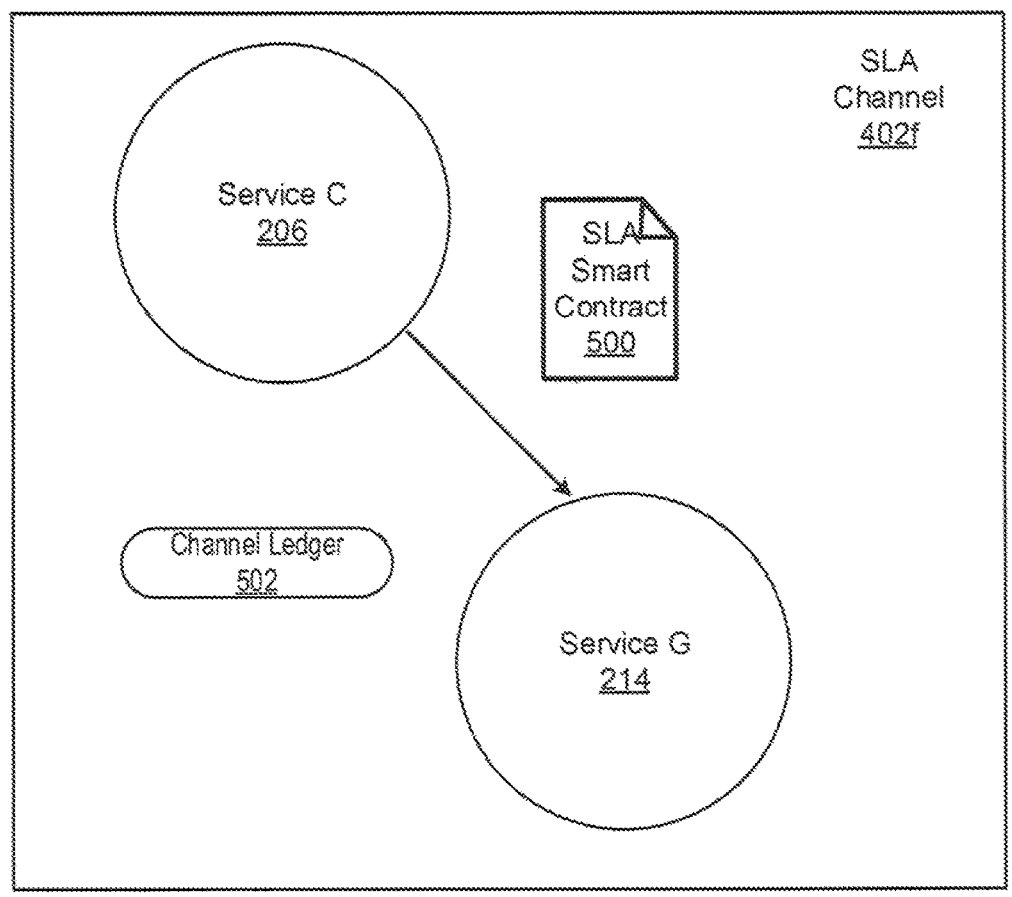
FIG. 5 illustrates a detailed view of an exemplary service level agreement channel according to at least one embodiment.

Referring now to FIG. 5, a detailed view of SLA channel 402f is depicted according to at least one embodiment. As shown in FIG. 4 and FIG. 5, SLA channel 402f includes Service C 206 and dependent sub-service Service G 214 as members of SLA channel 402f. Between the member services (i.e., Service C 206 and Service G 214) a SLA smart contract 500 is defined which encodes SLA benchmarks that the party services (i.e., Service C 206 and Service G 214) agreed will be maintained. For example, Service G 214 may agree to provide a minimum API response time to Service C 206. The SLA smart contract 500 will encode this minimum API response time constraint as a benchmark. In embodiments, the SLA smart contract 500 will be maintained within the private SLA channel 402f, thus providing privacy regarding the specific terms of the agreement between Service C 206 and Service G 214 since other services (e.g., Service A 202) are not members of the SLA channel 402f. Additionally, Service C 206 and Service G 214 within SLA channel 402f will each maintain a channel ledger, 502a and 502b, respectively, to record SLA violations that occur from breaching the SLA smart contract 500. For example, if the SLA smart contract 500, using data from the monitoring channel 300, determined that Service G 214 failed to meet the minimum API response time, the violation would be recorded as a new block chained to other blocks in the channel ledger 502. According to some embodiments, the new block would contain, at least, the violated constraint (i.e., minimum API response time), a time stamp when the violation occurred, and the services involved (i.e., Service C 206 and Service G 214).

Figure 6:
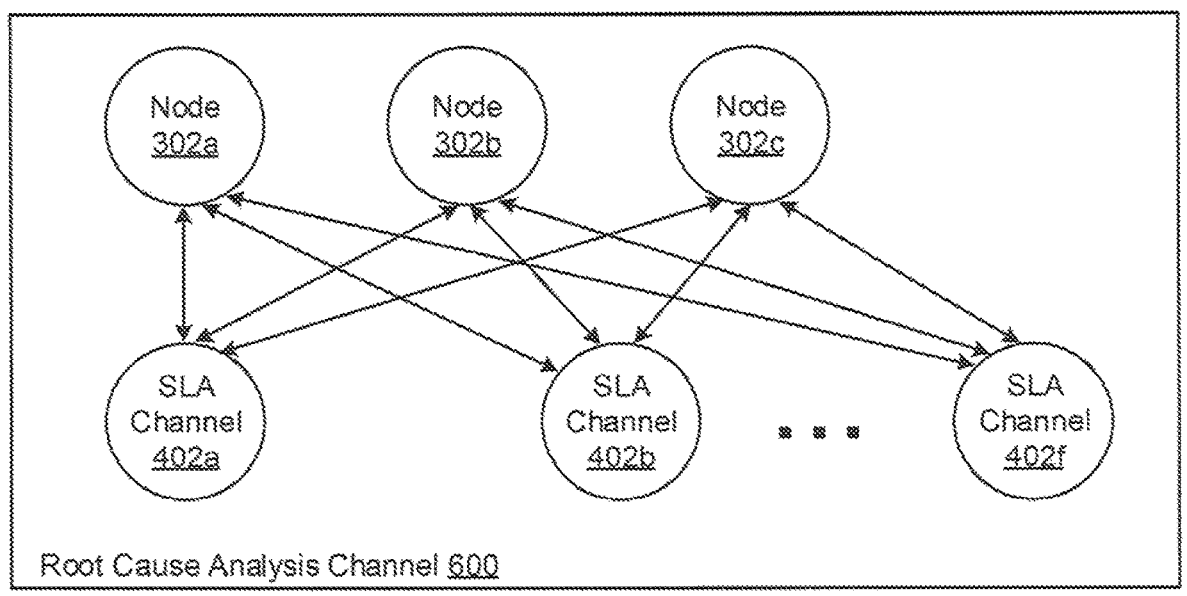
FIG. 6 illustrates an exemplary root cause analysis channel according to at least one embodiment.

Referring now to FIG. 6, an exemplary root cause analysis (RCA) channel 600 according to at least one embodiment is depicted. The RCA channel 600 may be implemented as a system-wide channel that is used to identify the root cause of an SLA violation. As shown, nodes 302a-c access the individual SLA channels 402a-f to analyze SLA violations that were recorded by the SLA channels 402a-f. More specifically, in some embodiments, the nodes 302a-c may access the channel ledgers 502a-b of the SLA channels 402a-f to retrieve SLA violation data. Since nodes 302a-c of the RCA channel 600 only have access to the SLA violation data recorded on the SLA channel 402a-f channel ledgers 502a-b and not the SLA smart contracts 500 in the SLA channels 402a-f, the RCA channel 600 can identify SLA violations without breaching the privacy of the SLA smart contract 500. In embodiments, the RCA channel 600 may use the RCA channel ledger for storing data of violated metrics. While FIG. 6 depicts the nodes 302a-c as the same nodes 302a-c that are part of the monitoring channel 300 illustrated in FIG. 3, in other embodiments, the RCA channel 600 may include a different set of nodes.

Figure 7:
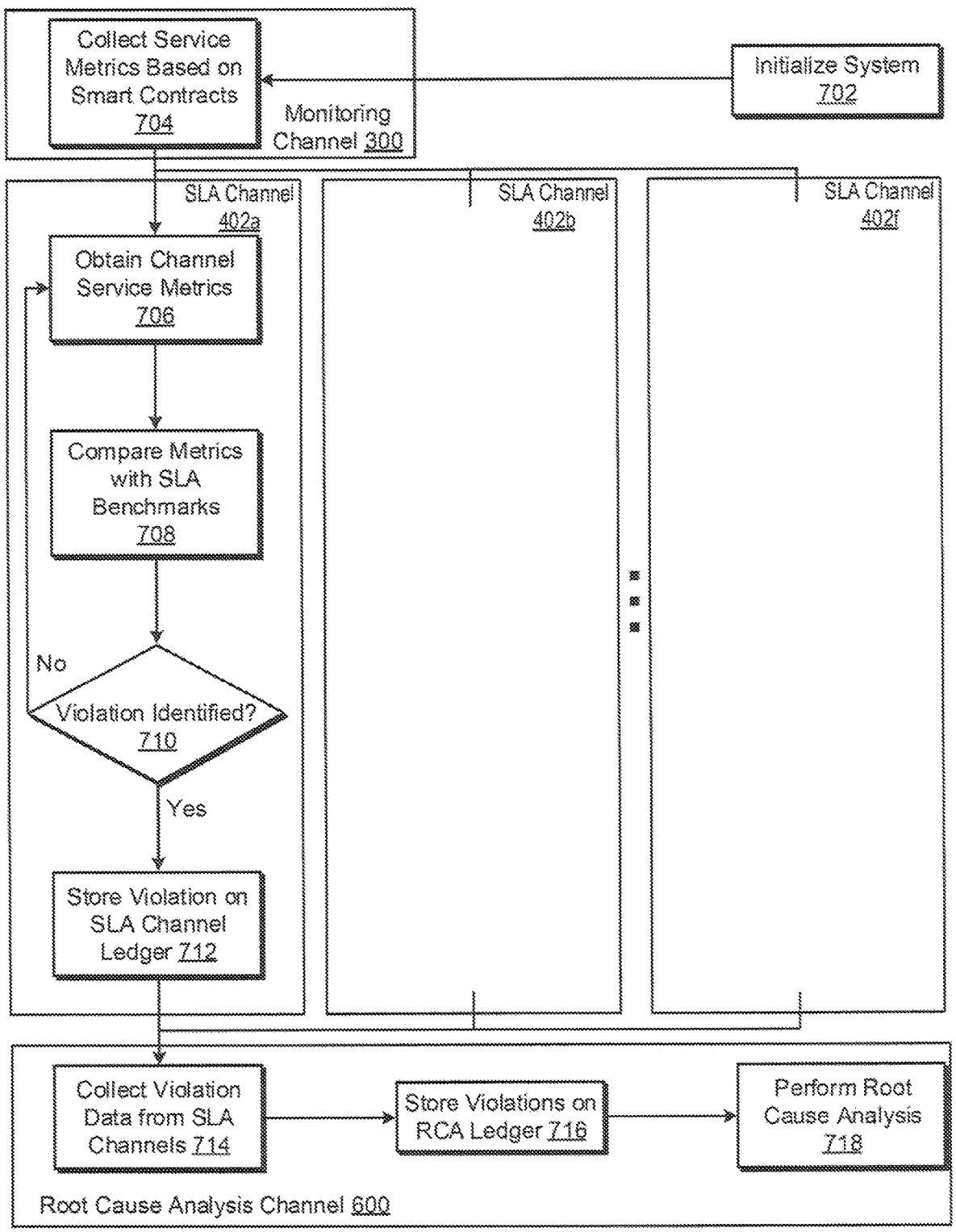
FIG. 7 is an operational flowchart illustrating a process for composite service SLA management according to at least one embodiment.

Referring now to FIG. 7, an operational flowchart illustrating the exemplary composite service SLA management process 700 used by the composite service SLA management program 110a and 110b according to at least one embodiment is depicted.

At 702 the composite service SLA management system is initialized within a blockchain network. Initialization of the system may include a system-wide channel that is created within a private blockchain network for use as the monitoring channel 300 having a set of nodes 302a-c and a state database 304. Thereafter, services (e.g., Service A 202) that comprise the composite service onboard or register, as described previously with respect to FIG. 3. As services onboard, the services also specify SLA metrics that the service wants the nodes 302a-c to monitor which are subsequently encoded in a smart contract 306.

As described previously with respect to FIGS. 4 and 5, multiple private channels are also created within the blockchain network corresponding with SLA relationships between services (i.e., service dependencies that are governed by an SLA) within the composite service. According to at least one embodiment, the SLA channels 402a-f may include two services (e.g., Service C 206, Service G 214), an SLA smart contract 500 which encodes the SLA between the services, and channel ledgers 502a-b that record SLA violations.

Additionally, an RCA channel 600 is also created as a system-wide channel within the blockchain network, as described above with respect to FIG. 6. As such, the RCA channel 600 is created with nodes 302a-c that access the SLA channel ledgers 502a-b for the SLA channels 402a-f.

After system initialization at 702, the monitoring channel 300 begins collecting service metrics based on the smart contracts 306a-b at 704. With the composite service SLA management system initialized, when a composite service begins executing, the nodes 302a-c in the monitoring channel 300 may periodically monitor the registered services based on the smart contracts 306a-b and aggregate the monitored data. Nodes 302a-c may initiate transactions at fixed intervals that trigger the smart contracts 306a-b to record the service metric data to the state database 304. In the event that the nodes 302a-c collect service metrics that do not agree (e.g., node 302a may measure a different minimum API request rate than node 302b), the smart contract 306 may resolve inconsistent data (e.g., if nodes 302a and 302c have the same data while node 302b is different, the data from 302a and 302c may be used due to a higher percentage of consensus among the nodes 302a-c), flag outlier data, and record the data in the state database 304.

Then, at 706, SLA channels 402a-f obtain channel service metrics from the monitoring channel 300. In embodiments, an SLA channel 402a-f SLA smart contract 500 may periodically query the monitoring channel 300 for the metric data that applies to the services (e.g., Service A 202, Service B 204) that are included in the SLA channel 402a-f and the specific constraints (e.g., minimum API response time, minimum API request rate) that are subject to the SLA benchmarks encoded in the SLA smart contract 500. For example, SLA smart contract 500 of SLA channel 402a may specify a benchmark threshold value for minimum API response time between Service A 202 and Service B 204. Consequently, the SLA channel 402a will periodically query the monitoring channel 300 to retrieve the relevant API response time metrics form the state database 304.

Next, at 708, the retrieved metrics are compared with the SLA benchmarks encoded in the SLA smart contract 500. In embodiments, the SLA smart contract 500 will compare the previously retrieved metrics to the benchmarks stipulated in the SLA. When services register with the monitoring channel 300, the service indicates metrics for monitoring that will provide the proper data to evaluate the service's compliance with the SLA benchmarks.

Continuing the previous example, Service B 204 may indicate when registering with the monitoring channel 300 that minimum API response time be monitored since Service B 204 has agreed to provide a threshold minimum API response time to Service A 202 as part of the SLA between Service A 202 and Service B 204. Therefore, the monitoring channel 300 will monitor the minimum API response time that Service B 204 provides for Service A 202. After receiving the minimum API response time (e.g., 350 milliseconds) from the monitoring channel 300 as described previously at step 706, the retrieved minimum API response time will be compared with the minimum API response time benchmark (e.g., 325 milliseconds) encoded in the SLA smart contract 500.

At 710, the smart contract 500 determines if any SLA benchmarks were violated as a result of comparing the received metrics with the SLA benchmarks. If, for example, the received minimum API response time is 350 milliseconds and the minimum API response time benchmark encoded in the SLA smart contract 500 is 325 milliseconds, the smart contract 500 would determine that the minimum API response time benchmark had been violated.

If the smart contract 500 determines that any SLA benchmarks were violated at 710, then the smart contract 500 records the violation at 712. The smart contract 500 may record violation data describing the SLA violation on the channel ledgers 502a-b. The violation data may include the constraint violated (e.g., minimum API response time), identifier corresponding with the services involved (e.g., Service B 204, Service A 202), and a timestamp indicating the time of the violation. According to at least one other embodiment, the violation data may further indicate the service that violated the SLA (e.g., Service B 204 violated an obligation to Service A 202).

However, if the smart contract 500 determines that no SLA benchmarks were violated at 710, then the smart contract 500 continues to obtain channel service metrics at 706 without further analysis. For example, if the received minimum API response time is 310 milliseconds and the minimum API response time benchmark encoded in the SLA smart contract 500 is 325 milliseconds, the smart contract 500 would determine that the minimum API response time benchmark was not violated and the smart contract 500 would retrieve new minimum API response time data at the next scheduled time interval.

While the flowchart depicted in FIG. 7 includes steps 706-712 with respect to SLA channel 402a, the same steps 706-712 may be performed concurrently in parallel for each additional SLA channel 402b-f that is part of the composite service. Steps 706-712 for the remaining SLA channels 402b-f are omitted from FIG. 7 for the sake of clarity.

Next, at 714, violation data is collected from the channel ledgers 502a-b of the SLA channels 402a-f by the root cause analysis (RCA) channel 600. For example, if the channel ledgers 502a-b of SLA channel 402a and SLA channel 402c contain violation data, the nodes 302a-c within the RCA channel 600 will collect the violation data from the channel ledgers 502a-b.

Then, at 716, the collected violation data is stored on the RCA channel ledger. In embodiments, the SLA violation data collected from the SLA channels 402a-f is aggregated and stored in the RCA channel ledger.

At 718 root cause analysis is performed. Nodes 302*a-c* in the RCA channel 600 may perform root cause analysis based on the violation data stored in the RCA channel ledger. The aggregated violation data may be analyzed to determine the sub-composition of the violation. For example, for multiple recorded violations of the minimum API response time constraint, the services involved in the SLA violations are matched to identify the sub-composition. As described previously, when the SLA smart contract 500 determines an SLA violation occurred, the smart contract 500 records the services involved in the violation within the violation data. If a minimum API response time violation is recorded between Service B 204 and Service A 202, and if another minimum API response time violation is recorded between Service B 204 and Service D 208, then sub-composition of Service A 202 to Service B 204 to Service D 208 is identified. Thus, sub-composition may be determined by combining service pairs that share a common service (e.g., Service B 204).

Thereafter, the timelines of services in the sub-composition may be analyzed. As described previously, the SLA smart contract 500 may record a timestamp in the violation data. The timestamps may be used to build and analyze a timeline. Continuing the previous example, the minimum API response time violation between Service D 208 and Service B 204 may have a timestamp of t1 and the minimum API response time violation between Service A 202 and Service B 204 may have a timestamp of t2. Therefore, a timeline may be constructed that establishes the violation between Service D 208 and Service B 204 (i.e., t1) occurred immediately before violation between Service A 202 and Service B 204 (i.e., t2).

After building and analyzing the sub-composition of services and the timeline of the violated constraint within the sub-composition, the earliest reported violation in the timeline is identified as the root cause of the violation. Based on the violation data of the services involved at the earliest reported violation, the offending service (or root cause service) may be identified. Continuing the previous example, since the violation between Service D 208 and Service B 204 at time t1 was the earliest reported violation of the minimum API response rate, the offending or violating service is one of the pair of Service D 208 and Service B 204. In some embodiments, the service (e.g., Service D 208) that violated the SLA may be identified in the violation data recorded by the SLA channel 402*a-f*. In other embodiments, the violating service may be identified as the service that is lowest in the composite service hierarchy 200, which in the previous example would be Service D 208 since Service B 204 depends on Service D 208. By using an automated and autonomous software solution as presented herein, real-time SLA violations may be detected and the service responsible for the violation may be identified.

After determining the offending service, corrective actions may be taken and penalties for violating the SLA may be applied. For example, the offending service may reallocate resources to prevent future violations, services that depend on the offending service may find a new service to use, and financial penalties may be assessed against the offending service according to the terms of the SLA.

According to some embodiments, the timestamps for related violations (e.g., violations of the same or similar constraints) within a predefined threshold of time may be considered as related to the same event. For example, an SLA violation at time t1 may still be considered the same event for an SLA violation at time t3 even though one violation does not immediately precede the other. If the violations nevertheless occur within a threshold time (e.g., within two time intervals), the violations may be considered to stem from the same event. If, however, SLA violations of the same constraint or metric do not fall within the defined time threshold, the violations may be analyzed as unrelated events.

It may be appreciated that FIGS. 2-7 provide only an illustration of one embodiment and do not imply any limitations with regard to how different embodiments may be implemented. Many modifications to the depicted embodiment(s) may be made based on design and implementation requirements.

For example, in some alternative embodiments, the following algorithm may be used to monitor and detect SLA violations using smart contracts.

```
monitorComposition(S)        //S: set of services
   for service in S:
      metrics = monitorMetrics (service)
      recordMetrics(metrics)
recordSLAViolation(s)        //s: a dependent service
   metrics = getMetrics(s)
   constraints = getSLAConstraints(s)
   status = checkMetrics(metrics, constraints)
   if (status == "failed"):
      recordViolation(s, constraint, timestamp)
findViolationCause(S)        //S: set of services
   channels = getCompositionChannels(S)
   for channel in channels:
      list = getRecentEvents(channel)
   for event in list:
      relatedEvent = checkEventCausality(event, list)
      if (relatedEvent):
         eventChain = recordViolationCausality(event, relatedEvent)
         actualEvent = findViolationCause(eventChain)
         recordViolationCause(actualEvent)
      else
         recordViolationCause(event)
```

As described in the embodiments above, the composite service SLA management program 110*a* and 110*b* may improve the functionality of a computer by providing a method to detect SLA violations within composite services in real-time while maintaining confidentiality. Moreover, aspects of the invention improve the technical field of cloud computing by providing an automated way to detect SLA violations within composite cross-domain software solutions and pinpoint the offending service while maintaining confidentiality. Further, the decentralized blockchain framework maintains trust in the system, even in the absence of a centralized, trusted authority. By using a blockchain framework, data transactions are automatically logged in the immutable blocks of transactions and any attempts to tamper with the transactions will be automatically reported. Using private channels in a blockchain restricts unauthorized data access to ensure each service is only allowed access to relevant information about dependent services and not the entire composite service topology. Thus, the embodiments described herein preserve privacy without inhibiting detection of SLA violations.

Figure 8:
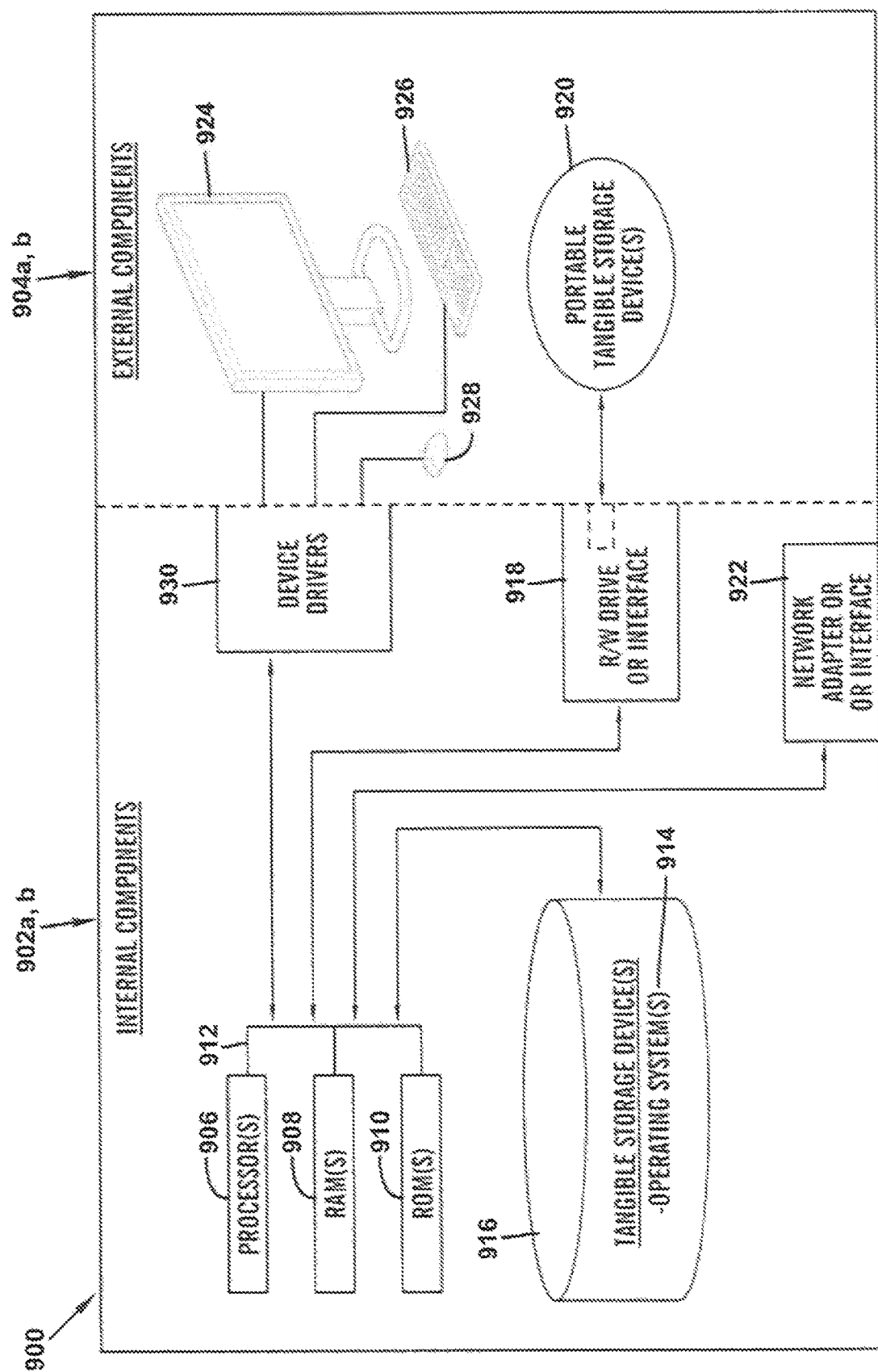
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 8. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the composite service SLA management program 110a in client computer 102, and the composite service SLA management program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the composite service SLA management program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the composite service SLA management program 110a in client computer 102 and the composite service SLA management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the composite service SLA management program 110a in client computer 102 and the composite service SLA management program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
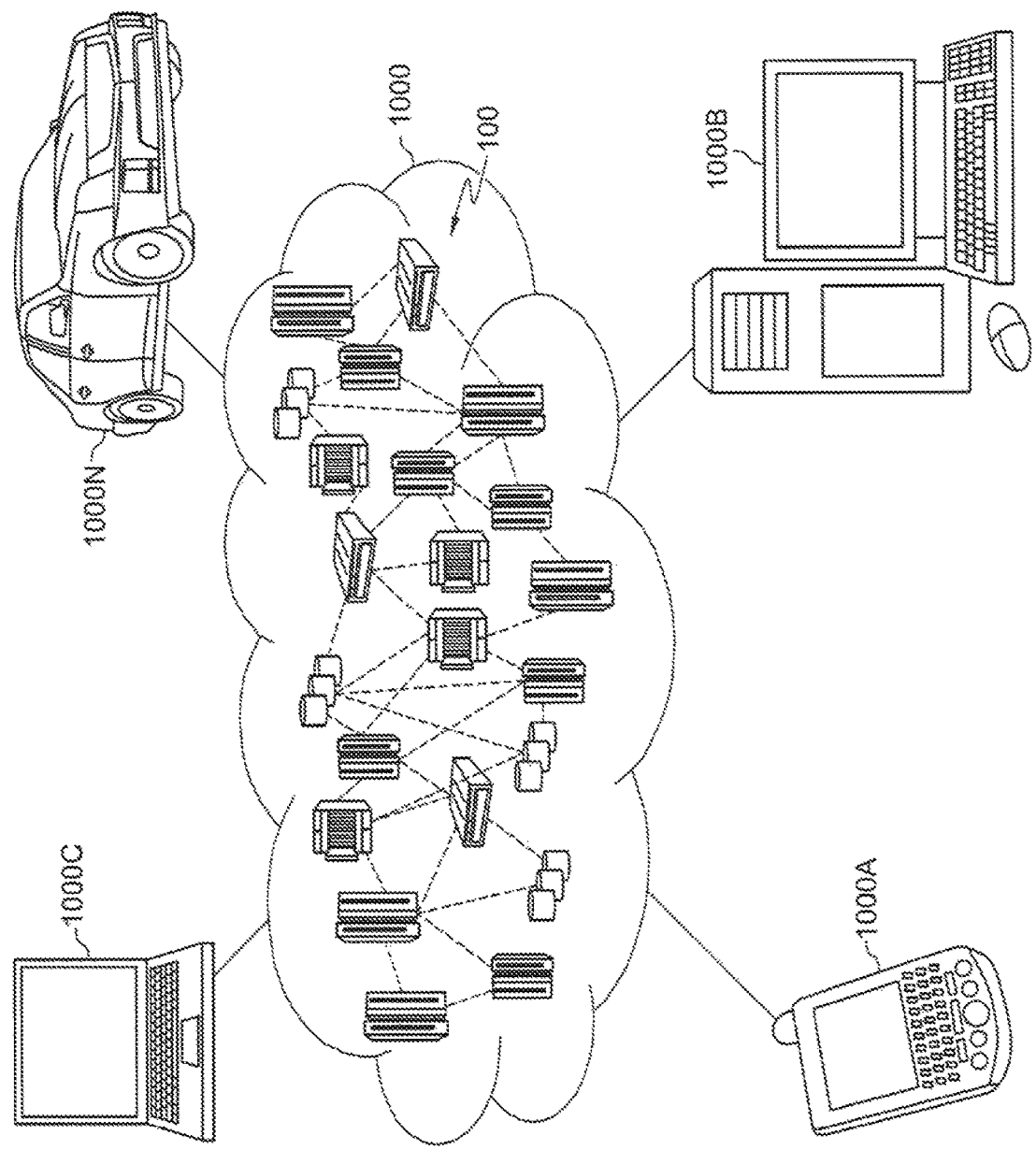
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and composite service SLA management 1156. A composite service SLA management program 110a, 110b provides a way to determine the root-cause of SLA violations in composite cloud services in real-time.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for service level agreement (SLA) management within a composite service using a blockchain network, the method comprising:
   collecting a plurality of service metrics from a plurality of services within the composite service;
   determining, by a first SLA smart contract, a first SLA violation occurred based on the collected plurality of service metrics violating a first SLA between a first pair of services within the plurality of services, wherein the first SLA smart contract and the first pair of services are associated with a first private channel within the blockchain network;
   determining, by a second SLA smart contract, a second SLA violation occurred based on the collected plurality of service metrics violating a second SLA between a second pair of services within the plurality of services, wherein the second SLA smart contract and the second pair of services are associated with a second private channel within the blockchain network;
   in response to determining the first SLA violation occurred and the second SLA violation occurred, determining that the first SLA violation and second SLA violation are related and the second SLA violation occurred before the first SLA violation; and
   in response to determining the first SLA violation and second SLA violation are related and the second SLA violation occurred before the first SLA violation, identifying a violating service within the second pair of services that is responsible for causing the first SLA violation.

2. The method of claim 1, wherein collecting the plurality service metrics from the plurality of services within the composite service, further comprises:
   registering the plurality of services, wherein the registered plurality of services requests the plurality of service metrics be collected; and
   in response to registering the composite service, creating a smart contract based on the requested plurality of service metrics.

3. The method of claim 1, wherein the first SLA smart contract encodes a first SLA between the first pair of services, and wherein the second SLA smart contract encodes a second SLA between the second pair of services.

4. The method of claim 1, wherein the first pair of services and the second pair of services share a common service.

5. The method of claim 1, further comprising:
   recording, by the first SLA smart contract, a first plurality of SLA violation data based on the first SLA violation in a first ledger associated with the first private channel; and
   recording, by the second SLA smart contract, a second plurality of SLA violation data based on the second SLA violation in a second ledger associated with the second private channel.

6. The method of claim 5, wherein determining that the first SLA violation and second SLA violation are related and the second SLA violation occurred before the first SLA violation is based on the recorded first plurality of SLA violation data and the recorded second plurality of SLA violation data, and wherein the recorded first plurality of SLA violation data includes a first pair of service identifiers corresponding with the first pair of services, a violated constraint, and a first timestamp and the recorded second plurality of SLA violation data includes a second pair of service identifiers corresponding with the second pair of services, the violated constraint, and a second timestamp.

7. The method of claim 6, wherein determining that the second SLA violation occurred before the first SLA violation is based on the second timestamp occurring before the first timestamp.

8. A computer system for service level agreement (SLA) management within a composite service using a blockchain network, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   collecting a plurality of service metrics from a plurality of services within the composite service;
   determining, by a first SLA smart contract, a first SLA violation occurred based on the collected plurality of service metrics violating a first SLA between a first pair of services within the plurality of services, wherein the first SLA smart contract and the first pair of services are associated with a first private channel within the blockchain network;
   determining, by a second SLA smart contract, a second SLA violation occurred based on the collected plurality of service metrics violating a second SLA between a second pair of services within the plurality of services, wherein the second SLA smart contract and the second pair of services are associated with a second private channel within the blockchain network;
   in response to determining the first SLA violation occurred and the second SLA violation occurred, determining that the first SLA violation and second SLA violation are related and the second SLA violation occurred before the first SLA violation; and
   in response to determining the first SLA violation and second SLA violation are related and the second SLA violation occurred before the first SLA violation, identifying a violating service within the second pair of services that is responsible for causing the first SLA violation.

9. The computer system of claim 8, wherein collecting the plurality service metrics from the plurality of services within the composite service, further comprises:
   registering the plurality of services, wherein the registered plurality of services requests the plurality of service metrics be collected; and
   in response to registering the composite service, creating a smart contract based on the requested plurality of service metrics.

10. The computer system of claim 8, wherein the first SLA smart contract encodes a first SLA between the first pair of services, and wherein the second SLA smart contract encodes a second SLA between the second pair of services.

11. The computer system of claim 8, wherein the first pair of services and the second pair of services share a common service.

12. The computer system of claim 8, further comprising:
   recording, by the first SLA smart contract, a first plurality of SLA violation data based on the first SLA violation in a first ledger associated with the first private channel; and recording, by the second SLA smart contract, a second plurality of SLA violation data based on the second SLA violation in a second ledger associated with the second private channel.

13. The computer system of claim 12, wherein determining that the first SLA violation and second SLA violation are related and the second SLA violation occurred before the first SLA violation is based on the recorded first plurality of SLA violation data and the recorded second plurality of SLA violation data, and wherein the recorded first plurality of SLA violation data includes a first pair of service identifiers corresponding with the first pair of services, a violated constraint, and a first timestamp and the recorded second plurality of SLA violation data includes a second pair of service identifiers corresponding with the second pair of services, the violated constraint, and a second timestamp.

14. The computer system of claim 13, wherein determining that the second SLA violation occurred before the first SLA violation is based on the second timestamp occurring before the first timestamp.

15. A computer program product for service level agreement (SLA) management within a composite service using a blockchain network, comprising a computer-readable storage medium having program instructions embodied therewith, the program instructions executable by a processor to cause the processor to perform a method comprising:
    collecting a plurality of service metrics from a plurality of services within the composite service;
    determining, by a first SLA smart contract, a first SLA violation occurred based on the collected plurality of service metrics violating a first SLA between a first pair of services within the plurality of services, wherein the first SLA smart contract and the first pair of services are associated with a first private channel within the blockchain network;
    determining, by a second SLA smart contract, a second SLA violation occurred based on the collected plurality of service metrics violating a second SLA between a second pair of services within the plurality of services, wherein the second SLA smart contract and the second pair of services are associated with a second private channel within the blockchain network;
    in response to determining the first SLA violation occurred and the second SLA violation occurred, determining that the first SLA violation and second SLA violation are related and the second SLA violation occurred before the first SLA violation; and
    in response to determining the first SLA violation and second SLA violation are related and the second SLA violation occurred before the first SLA violation, identifying a violating service within the second pair of services that is responsible for causing the first SLA violation.

16. The computer program product of claim 15, wherein collecting the plurality service metrics from the plurality of services within the composite service, further comprises:
    registering the plurality of services, wherein the registered plurality of services requests the plurality of service metrics be collected; and
    in response to registering the composite service, creating a smart contract based on the requested plurality of service metrics.

17. The computer program product of claim 15, wherein the first SLA smart contract encodes a first SLA between the first pair of services, and wherein the second SLA smart contract encodes a second SLA between the second pair of services.

18. The computer program product of claim 15, wherein the first pair of services and the second pair of services share a common service.

19. The computer program product of claim 15, further comprising:
    recording, by the first SLA smart contract, a first plurality of SLA violation data based on the first SLA violation in a first ledger associated with the first private channel; and
    recording, by the second SLA smart contract, a second plurality of SLA violation data based on the second SLA violation in a second ledger associated with the second private channel.

20. The computer program product of claim 19, wherein determining that the first SLA violation and second SLA violation are related and the second SLA violation occurred before the first SLA violation is based on the recorded first plurality of SLA violation data and the recorded second plurality of SLA violation data, and wherein the recorded first plurality of SLA violation data includes a first pair of service identifiers corresponding with the first pair of services, a violated constraint, and a first timestamp and the recorded second plurality of SLA violation data includes a second pair of service identifiers corresponding with the second pair of services, the violated constraint, and a second timestamp.

* * * * *